(12) United States Patent
Oyama

(10) Patent No.: US 8,723,926 B2
(45) Date of Patent: May 13, 2014

(54) PARALLAX DETECTING APPARATUS, DISTANCE MEASURING APPARATUS, AND PARALLAX DETECTING METHOD

(75) Inventor: Ichiro Oyama, Osaka (JP)

(73) Assignee: Panasonic Corporation, Osaka (JP)

( * ) Notice: Subject to any disclaimer, the term of this patent is extended or adjusted under 35 U.S.C. 154(b) by 499 days.

(21) Appl. No.: 13/057,201

(22) PCT Filed: Jul. 13, 2010

(86) PCT No.: PCT/JP2010/004519
§ 371 (c)(1),
(2), (4) Date: Feb. 2, 2011

(87) PCT Pub. No.: WO2011/010438
PCT Pub. Date: Jan. 27, 2011

(65) Prior Publication Data
US 2011/0157320 A1    Jun. 30, 2011

(30) Foreign Application Priority Data

Jul. 22, 2009    (JP) .................................. 2009-171650

(51) Int. Cl.
*H04N 13/02*    (2006.01)
(52) U.S. Cl.
USPC ......................................................... 348/49
(58) Field of Classification Search
USPC ................................................... 348/42–60
See application file for complete search history.

(56) References Cited

U.S. PATENT DOCUMENTS

| | | | | |
|---|---|---|---|---|
| 4,965,840 | A * | 10/1990 | Subbarao ...................... | 382/106 |
| 5,076,687 | A * | 12/1991 | Adelson ........................ | 356/4.04 |
| 6,028,624 | A * | 2/2000 | Watkins ......................... | 348/122 |
| 7,170,677 | B1 * | 1/2007 | Bendall et al. ................ | 359/464 |
| 7,228,005 | B1 * | 6/2007 | Yuan ............................. | 382/280 |
| 7,479,982 | B2 * | 1/2009 | Otani et al. ................... | 348/188 |

(Continued)

FOREIGN PATENT DOCUMENTS

| | | |
|---|---|---|
| JP | 1-167610 | 7/1989 |
| JP | 2000-283753 | 10/2000 |

(Continued)

OTHER PUBLICATIONS

International Search Report issued Sep. 7, 2010 in International (PCT) Application No. PCT/JP2010/004519.

(Continued)

*Primary Examiner* — Dave Czekaj
*Assistant Examiner* — Mohammad J Rahman
(74) *Attorney, Agent, or Firm* — Wenderoth, Lind & Ponack, L.L.P.

(57) ABSTRACT

The present invention aims to provide a parallax detecting apparatus (3) and the like which is capable of suppressing the degree of parallax detection error even in the case of using cameras each having a lens whose resolution is low for the pitch of the pixels of the imaging devices. The parallax detecting apparatus (3) which calculates a parallax that occurs between optical systems includes: a PSF approximating unit (5) configured to modify at least one of images obtained from the respective optical systems such that point spread functions of the optical systems are made to sufficiently approximate a point spread function of a predetermined optical system; and a parallax calculating unit (9) configured to calculate the parallax that occurs between the optical systems, using the image modified by the PSF approximating unit (5).

11 Claims, 14 Drawing Sheets

(56) References Cited

U.S. PATENT DOCUMENTS

| | | | |
|---|---|---|---|
| 7,718,940 B2* | 5/2010 | Hirasawa et al. | 250/201.8 |
| 2003/0158503 A1* | 8/2003 | Matsumoto | 600/593 |
| 2004/0056966 A1* | 3/2004 | Schechner et al. | 348/229.1 |
| 2004/0066454 A1 | 4/2004 | Otani et al. | |
| 2004/0169922 A1* | 9/2004 | Wilson et al. | 359/462 |
| 2007/0285553 A1 | 12/2007 | Morita et al. | |
| 2008/0237351 A1* | 10/2008 | Goren et al. | 235/470 |
| 2008/0316323 A1 | 12/2008 | Morita et al. | |
| 2009/0074316 A1 | 3/2009 | Morita et al. | |
| 2010/0048242 A1* | 2/2010 | Rhoads et al. | 455/556.1 |
| 2010/0201809 A1* | 8/2010 | Oyama et al. | 348/135 |

FOREIGN PATENT DOCUMENTS

| | | |
|---|---|---|
| JP | 2003-65714 | 3/2003 |
| JP | 2004-37270 | 2/2004 |
| JP | 2007-304525 | 11/2007 |
| JP | 2008-97327 | 4/2008 |
| JP | 2008-524673 | 7/2008 |
| JP | 2009-87329 | 4/2009 |
| JP | 2010-276447 | 12/2010 |
| WO | 2006/062325 | 6/2006 |

OTHER PUBLICATIONS

Go et al., "Sanjigen Bijon ("Three Dimensional Vision")" Kyoritsu Shuppan Co., Ltd., Apr. 20, 1998, pp. 96-99.

* cited by examiner

Image block 201a

Image block 201b

Decentering D

Optical system of camera a

Decentering Da

Optical system of camera b

Decentering Db

Point spread function (PSF) of optical system of camera a

Point spread function (PSF) of optical system of camera b

Optical system of camera a

Decentering Da

Optical system of camera b

Decentering Db

Point spread function (PSF) of optical system of camera a

Point spread function (PSF) of optical system of camera b

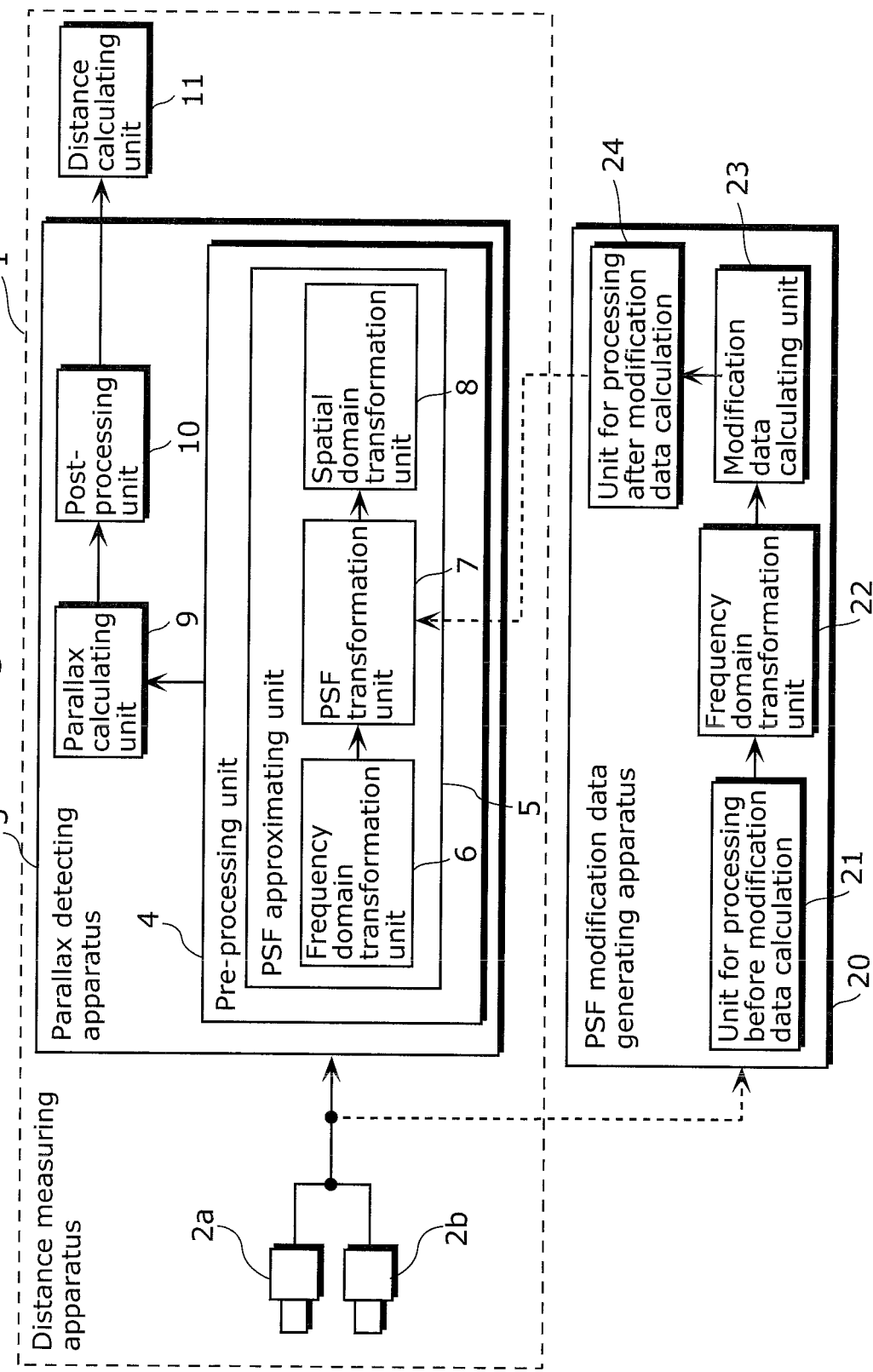

First optical system
of camera 2a

Decentering

Second optical system
of camera 2b

Decentering

Point spread function (PSF)
of first optical system
of camera 2a

↓ Two-dimensional
  Fourier
  transformation
OTF $F_{pa}(u, v)$

Point spread function (PSF)
of first optical system
of camera 2b

↓ Two-dimensional
  Fourier
  transformation
OTF $F_{pb}(u, v)$

Point spread function of first optical system of camera 2a

Modified point spread function of second optical system of camera 2b

Point spread function (PSF)
of camera optical system
of model camera

⬇ Two-dimensional
　　Fourier
　　transformation
OTF

Fps (u, v)

Modified point
spread function of
first optical system

Modified point spread
function of second
optical system

PARALLAX DETECTING APPARATUS, DISTANCE MEASURING APPARATUS, AND PARALLAX DETECTING METHOD

TECHNICAL FIELD

The present invention relates to parallax detecting apparatuses which calculate a parallax that occurs between plural optical systems.

BACKGROUND ART

Recent years have seen increasing demands for measuring the distance from a predetermined position to an object or the three dimensional position of the object with high accuracy. For example, for a case of supporting a field of view from a car, one method provided is intended to more reliably prevent a collision between the car and surrounding objects by simultaneously displaying not only a video of the surrounding objects captured by a camera attached to the car but also displaying more accurate distance information indicating the distances between the car and the objects measured by a distance measuring apparatus. In addition, for a case of a mobile phone or a television set, an input/output device for three dimensional video is desired to more faithfully reproduce such video that provides a sense of reality. For these applications, there is a demand for increasing accuracy in distance measurement by distance measuring apparatuses.

Conventionally used schemes for measuring a distance to an object or the three dimensional position of the object include stereo distance measuring schemes applying a triangulation principle. According to such a stereo distance measuring scheme, the distance to the object is calculated based on a parallax that occurs between plural cameras.

FIG. 1 is a diagram illustrating an example of calculation of a distance to an object according to a stereo distance measuring scheme in the case of using two cameras that are a camera a and a camera b. A light beam 101a forms an image on an imaging area 104a through an optical center 105a of a lens 102a of the camera a, and a light beam 101b forms an image on an imaging area 104b through an optical center 105b of a lens 102b of the camera b. Optical axes 103a and 103b represent the optical axes of the cameras. Here is an exemplary case where (i) an image of the object 100 is formed at an image forming position 107a distant, by Pa, from an to intersection 106a between an imaging area 104a and the optical axis 103a in the camera a and (ii) an image of the object 100 is formed at an image forming position 107b distant, by Pb, from an intersection 106b between an imaging area 104b and the optical axis 103b in the camera b. In this case, a parallax P (=Pb−Pa) occurs between the is camera a and the camera b. The parallax P changes depending on a distance D between the distance measuring apparatus and the object. The optical axis 103a of the camera a and the optical axis 103b of the camera b are parallel to each other. When the interval is denoted as a base line length B, and the focal lengths of the cameras a and b are denoted as f, the distance D to the object is represented by Expression (1). Accordingly, assuming that the base line length B and focal lengths f are already known by a previously performed calibration, it is possible to calculate the distance D to the object 100 by calculating the parallax P.

[Math. 1]

$$D = f\frac{B}{P}$$ (Expression 1)

It is to be noted that the optical axes of the cameras a and b are not parallel in real environments in most cases. In such cases, there is a need to perform rectification as shown in Non-patent Literature 1, for example. As a result, an image obtainable in the case where the optical axes of the lenses are parallel is generated, thereby making it possible to calculate the distance D according to the calculation of Expression (1).

Each of the imaging areas 104a and 104b are generally configured with imaging devices such as CCDs (Charge Coupled Devices) and CMOS (Complementary Metal Oxide Semiconductors). Accordingly, the parallax P is calculated using luminance signals from the object image discrete on a two dimensional plane, and the parallax detection resolution corresponds to normally one pixel. The distance measurement resolution (hereinafter referred to as distance measurement accuracy) is determined based on the parallax detection resolution according to Expression (1).

A description is given of an exemplary method of detecting a parallax P performed by a conventional parallax detecting apparatus. The parallax detecting apparatus calculates SADs (Sums of Absolute Differences) for an image a captured in the imaging area 104a of the camera a and an image b captured in the imaging area 104b of the camera b. A SAD is a correlation value between each of small areas in an image and a corresponding one of small areas in a corresponding image. Next, the parallax detecting apparatus calculates, using the calculated correlation value, the shifts between the sub-images of pairs of mutually corresponding small areas in the images a and b. It is to be noted that SADs are examples of correlation values, and other available correlation values include generally-known SSDs (Sum of Squared Differences) and NCC (Normalized Cross-correlation).

The following describes calculation of a parallax using SADs that are representative correlation values, with reference to FIG. 2 to FIG. 5.

FIG. 2 is a diagram illustrating a method of representing luminance of each pixel in an image. As shown in FIG. 2, "0" denotes black, "15" denotes white, and a luminance level of each pixel is represented by a line density. A luminance may be a value at or below the decimal point.

FIG. 3A is a diagram showing a part of the image a when the texture of the object in the image is viewed from the object side. FIG. 3B is a diagram showing a part of the image b when the texture of the object in the image is viewed from the object side.

An image block 201b enclosed by bold lines in FIG. 3B forms the same image as an image of the image block 201a enclosed by bold lines in FIG. 3A in the case where the object is present at an infinite distance. In the case where the object is present at a finite distance, a parallax occurs as shown in FIG. 3A and FIG. 3B, and thus the image of FIG. 3B is formed with a shift to the right compared with the image of FIG. 3A. Here is given a description in the case where there is an actual parallax corresponding to 3. 6 pixels between FIG. 3A and FIG. 3B. In order to search the image region having the highest correlation with the image block 201a, the parallax detecting apparatus shifts, by one pixel, the image block 201b to the right from the position shown by the bold lines in the FIG. 3B, and calculates the SAD for each shift amount according to Expression (2).

[Math. 2]

$$SAD = \Sigma |Ia(i,j) - Ib(i,j)|$$ (Expression 2)

Here, each of Ia and Ib denotes a luminance value within each image block, and each of i and j denotes a local address within the image block. The image block 201a and the image block 201b have the same image size. The parallax detecting apparatus calculates, for each shift amount, the total sum within the block of the absolute values of differences in luminance in the same addresses of the pairs of mutually corresponding image blocks. The image blocks may have a rectangular shape or a shape according to the feature of the texture, but here is described a case of a square image block.

FIG. 4 is a diagram showing variation in SAD when the image block 201b is shifted by one pixel. It is conceivable that the image block 201a and the image block 201b have the highest correlation with each other when the shift amount corresponds to four pixels because the smallest SAD is obtained. Therefore, the parallax between the camera a and the camera b at the image block 201a is calculated as four pixels. In addition, multiplication of the calculated parallax and a pixel pitch size yields the parallax P in Expression (1) and the distance D to the object. In this case, although the parallax detecting apparatus can calculate a parallax approximate to the actual parallax corresponding to 3.6 pixels, the parallax detection accuracy is one pixel, and thus the parallax detecting apparatus cannot calculate the parallax at a pixel accuracy at or below the decimal point (hereinafter referred to as a sub-pixel parallax).

Methods of estimating a sub-pixel level parallax have been provided as methods of obtaining distance measurement accuracy, that is, a parallax detection resolution not at a one pixel unit but at a higher accuracy (for example, see PTL (Patent Literature) 1). For example, according to a sub-pixel parallax estimation method called equiangular linear fitting, an actual parallax is estimated at a sub-pixel level by one dimensional linear interpolation performed assuming that variation in SAD shows the same tilt θ at both the left and right sides with respect to the actual parallax as shown in FIG. 5. The following Expression (3) shows the sub-pixel parallax calculation expression, that is, the interpolation expression, in equiangular linear fitting.

[Math. 3]

$$P = P\text{min} + d \quad \text{(Expression 3)}$$
When $R(1) < R(-1)$,
$$d = 0.5 \frac{R(1) - R(-1)}{R(0) - R(-1)}$$
The other cases,
$$d = 0.5 \frac{R(1) - R(-1)}{R(0) - R(1)}$$

Here, P denotes a sub-pixel parallax, Pmin denotes a shift amount (an integer parallax) that yields the smallest SAD, and R(0) denotes a correlation value (SAD) at the shift amount that yields the smallest SAD. The SADs at the adjacent shift amounts are assumed to be R (−1) and R (1).

The conventional methods further include methods of calculating an actual parallax by interpolation using a high-order linear function such as a quadric or a non-linear function. In particular, in the case of an object having luminance that varies according to a linear function as shown in FIGS. 3A and 3B, variation in SAD is symmetric with respect to the actual parallax as shown in FIG. 4, and looks linear. For this reason, the parallax detecting apparatus is capable of accurately calculating the parallax corresponding to 3.6 pixels by estimating the sub-pixel parallax using equiangular linear fitting.

CITATION LIST

Patent Literature

[PTL 1]
Japanese Laid-open Patent Application Publication No. 2000-283753

Non Patent Literature

[NPL 1]
"Three-dimensional vision", Go Jo and Saburo Tsuji, Kyoritsu Shuppan, pp. 79-83, pp. 96-99

SUMMARY OF INVENTION

Technical Problem

When stereo distance measurement is performed using plural cameras, cameras each having a lens whose resolution is low for the pitch of the pixels of the imaging devices may be used for the reason of reducing the number of a set of lenses with an aim to reduce the cost or heights or for another intentional reason. One problem in such a case is that the degree of parallax detection error in the stereo distance measurement is large.

The present invention has been conceived in order to solve the aforementioned problem, and has an object to provide parallax detecting apparatuses capable of suppressing the degree of parallax detection error even in the case of using cameras each having a lens whose resolution is low for the pitch of the pixels of the imaging devices.

Solution to Problem

In order to achieve the aforementioned object, a parallax detecting apparatus according to an aspect of the present invention includes: a point spread function approximating unit configured to modify at least one of images obtained from the respective optical systems such that point spread functions of the optical systems are made to sufficiently approximate a point spread function of a predetermined optical system; and a parallax calculating unit configured to calculate the parallax that occurs between the optical systems, using the image modified by the point spread function approximating unit.

With this, it is possible to modify the image such that the images have a small difference in aberration distribution between images captured by different cameras, and thereby making it possible to suppress the degree of error in parallax detection even in the case of using cameras each having a lens whose resolution is low for the pitch of the pixels of the imaging devices.

In addition, it is preferable that the point spread function approximating unit includes: a frequency domain transforming unit configured to transform at least one of the images from a spatial domain into a frequency domain; a point spread function transforming unit configured to modify the image by reflecting modification data to the image transformed into the frequency domain by the frequency domain transforming unit, such that the point spread functions of the optical systems are made to sufficiently approximate the point spread function of the predetermined optical system; and a spatial domain transforming unit configured to inversely transform the image modified by the point spread function transforming unit from the frequency domain to the spatial domain, and that the parallax calculating unit is configured to calculate the parallax, using the image inversely transformed by the spatial domain transforming unit, and the modification data is either (i) data obtained by dividing a first optical transfer function by a second optical transfer function that is of an optical system in which the image to be modified using the modification data is obtained or (ii) data equivalent to the obtained data In addition, it is preferable that the point spread function transforming unit is configured to modify the image by multiplying, by the modification data, the image transformed into the frequency domain by the frequency domain transforming unit.

This makes it possible to efficiently modify the image transformed from the spatial domain to the frequency domain. Furthermore, it is possible to reduce, using the optical transfer function, the difference in the aberration distribution between images captured by the different cameras, and thereby making it possible to suppress the degree of parallax detection error. In short, it is possible to increase accuracy in distance measurement by stereo cameras.

In addition, it is preferable that the first optical transfer function is of one of the optical systems that functions as a reference optical system.

In this case, it is possible to further increase accuracy in the distance measurement by the stereo cameras, and eliminate the necessity of modifying the aberration distribution of the reference optical system. Therefore, it is possible to reduce the calculation time.

In addition, it is preferable that the first optical transfer function has a ratio that is (i) of a magnitude of a value in a second is spatial frequency with respect to a value in the first spatial frequency and (ii) greater than a corresponding ratio of a magnitude of a value in the second optical transfer function of the optical system in which the image to be modified by the point spread function approximating unit is obtained, the second spatial frequency being higher than the first spatial frequency.

In this case, it is possible to further increase accuracy in the distance measurement by the stereo cameras, and can increase the resolutions of the captured images. Therefore, it is possible to output images having a high resolution together with the distance measurement data.

In addition, it is preferable that magnitudes of values of the first optical transfer function are approximately the same in all the spatial frequency ranges.

In this case, it is possible to further increase accuracy in the distance measurement by the stereo cameras, and can increase the resolutions of the captured images. Therefore, it is possible to output images having a higher resolution together with the distance measurement data.

In addition, it is preferable that the parallax detecting apparatus further includes a modification data generating unit configured to generate, as modification data, either (i) data obtained by dividing the first optical transfer function by the second optical transfer function that is of the optical system in which the image to be modified by the point spread function approximating unit is obtained or (ii) data equivalent to the obtained data, and that the point spread function transforming unit is configured to reflect the modification data generated by the modification data generating unit to the image transformed into the frequency domain by the frequency domain transforming unit.

In this way, it is possible to generate the modification data. Even when the point spread function of an optical system changes, it is possible to generate the modification data according to the changed point spread function.

In addition, it is preferable that the point spread function of the predetermined optical system is a point spread function of an optical system that functions as a reference optical system among the optical systems.

In this case, there is no need to modify the image obtained by the reference optical system. Therefore, it is possible to reduce the calculation time necessary for the approximation of the point spread functions.

A distance measuring apparatus according to an aspect of the present invention includes: the parallax detecting apparatus; and a distance calculating unit configured to calculate a distance to an object, using the parallax detected by the parallax detecting apparatus.

With this, it is possible to suppress the degree of parallax detection error, and thereby increasing accuracy in the stereo distance measurement.

The present invention can be implemented not only as the aforementioned parallax detecting apparatus, but also as a parallax detecting method having the steps corresponding to the operations performed by the unique structural units of the parallax detecting apparatus. Furthermore, the present invention can be implemented as a program causing a computer having a processor and a memory to execute these steps of the parallax detecting method. Such a program can naturally be distributed through recording media such as CD-ROMs or via communication media such as the Internet.

Advantageous Effects of Invention

According to the present invention, it is possible to reduce the difference in the aberration distribution between images captured by different cameras. Therefore, it is possible to reduce the difference in distortion between the images in the case where the same subject is captured by the different cameras. Accordingly, it is possible to suppress the degree of parallax detection error even in the case of using cameras each having a lens whose resolution is low for the pitch of the pixels of the imaging devices.

BRIEF DESCRIPTION OF DRAWINGS

FIG. 15A is a structural diagram of a distance measuring system according to Embodiment 1 of the present invention.

DESCRIPTION OF EMBODIMENTS

When stereo distance measurement is performed using plural cameras, cameras each having a lens whose resolution is low for the pitch of the pixels of the imaging devices may be used for the reason of reducing the number of sets of lenses with an aim to reduce the cost or heights of the cameras or for another intentional reason. In this case, an inter-camera difference between either the decentering amounts of lenses or tilt amounts increases an inter-camera difference in the aberration distributions of images. A large difference in the aberration distributions increases a difference in distortion in the images of the same subject captured by different cameras, which increases the degree of parallax detection error.

Figure 6:
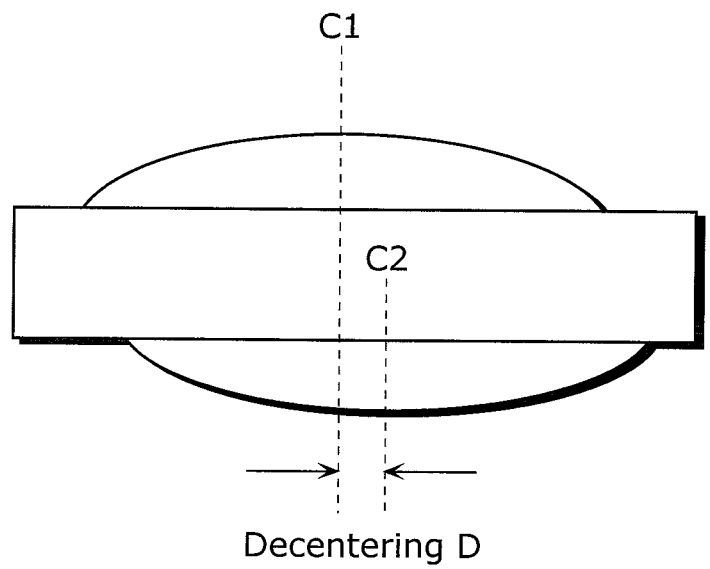
FIG. 6 is an illustration of decentering of lenses.

Here, decentering represents a shift D between an optical axis C1 at one surface side of a lens and an optical axis C2 at the other surface side of the lens as shown in FIG. 6. In the case of a set of lenses, an amount of shift in the optical axes of the lenses is also referred to as decentering.

Figure 7:
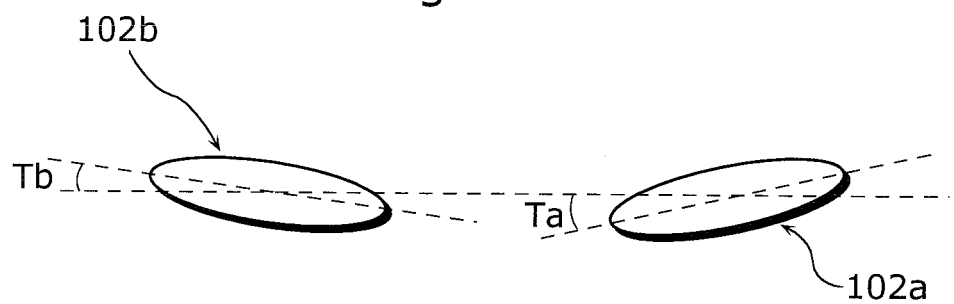
FIG. 7 is an illustration of tilt of lenses.
Figure 8:
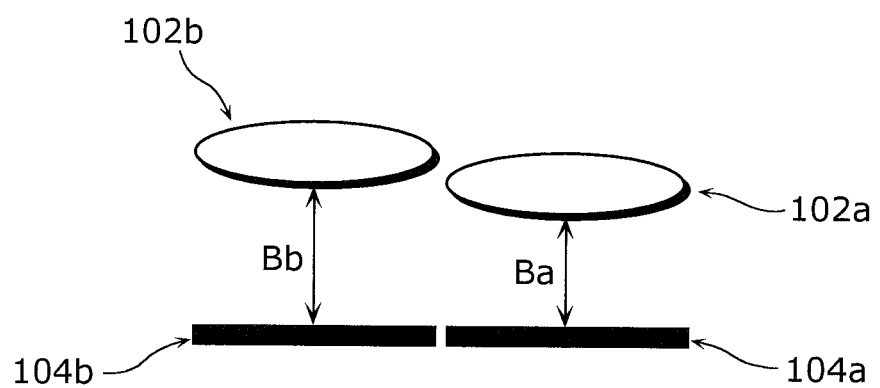
FIG. 8 is an illustration of the amounts of back focus of the lenses.

In addition, also in the case where a large difference Td (=Ta−Tb) exists between the tilt amount of a lens of a camera a and the tilt amount of a lens of a camera b as shown in FIG. 7 and in the case where a large difference Bf (=Ba−Bb) exists between a back focus amount of the camera b as shown in FIG. 8, a large difference exists in the aberration distributions of the cameras, which increases the degree of parallax detection error.

Figure 1:
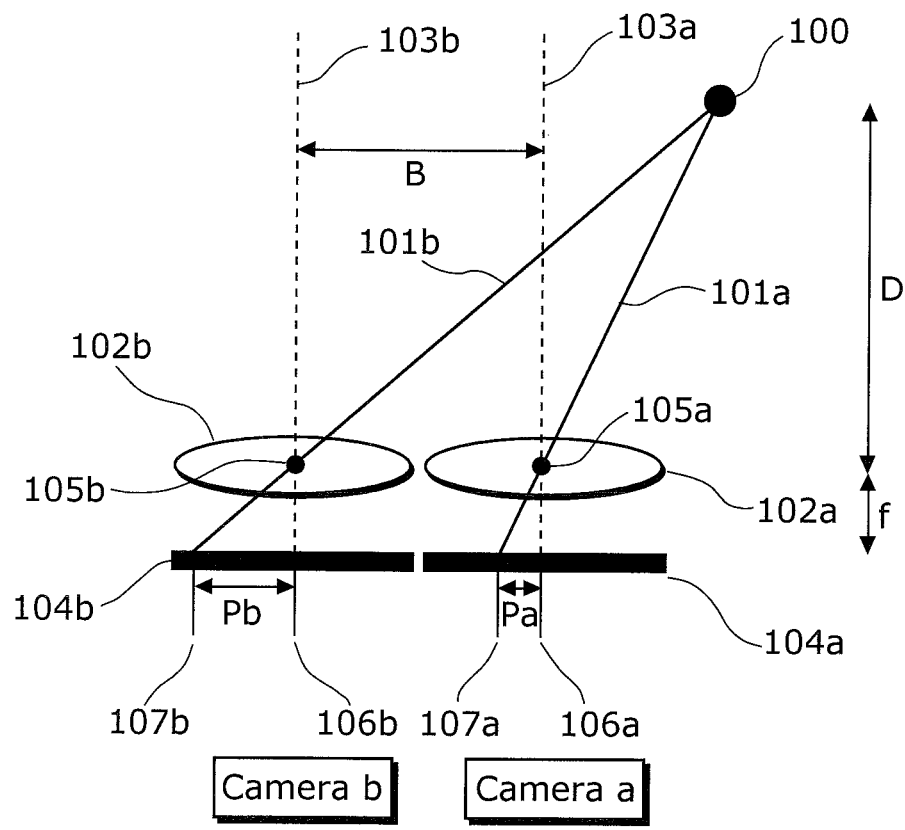
FIG. 1 is an illustration of a conventional stereo distance measurement principle.
Figure 2:
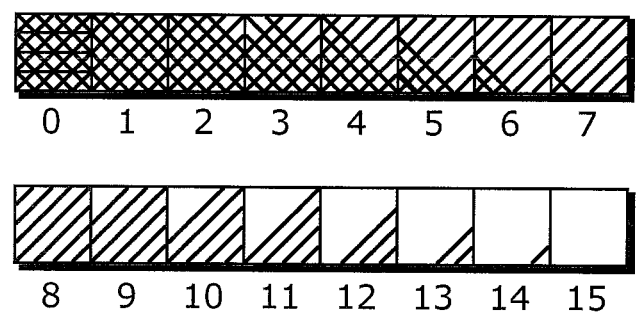
FIG. 2 is an illustration of a conventional method of representing luminance of an image.
Figure 3A:
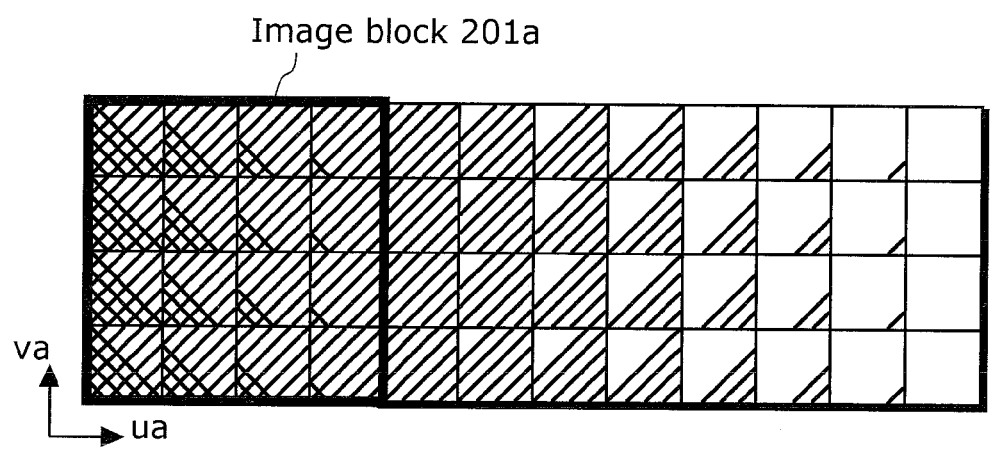
FIG. 3A is an illustration of a conventional parallax calculation.
Figure 3B:
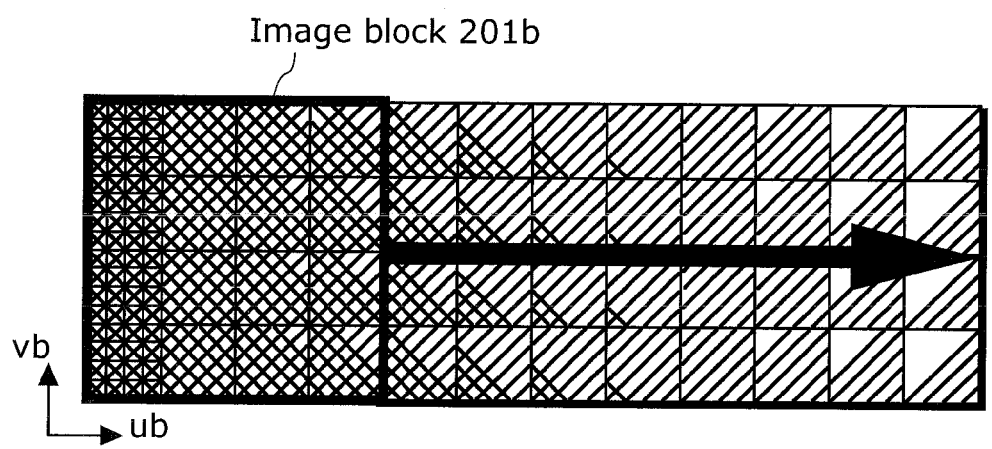
FIG. 3B is an illustration of a conventional parallax calculation.
Figure 4:
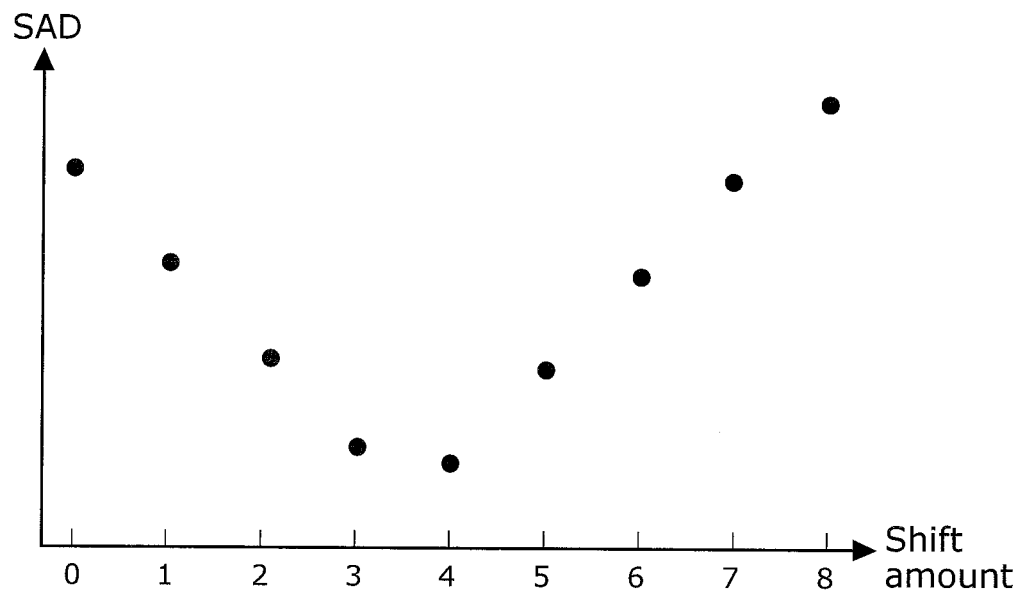
FIG. 4 is a graph illustrating a conventional parallax calculation.
Figure 5:
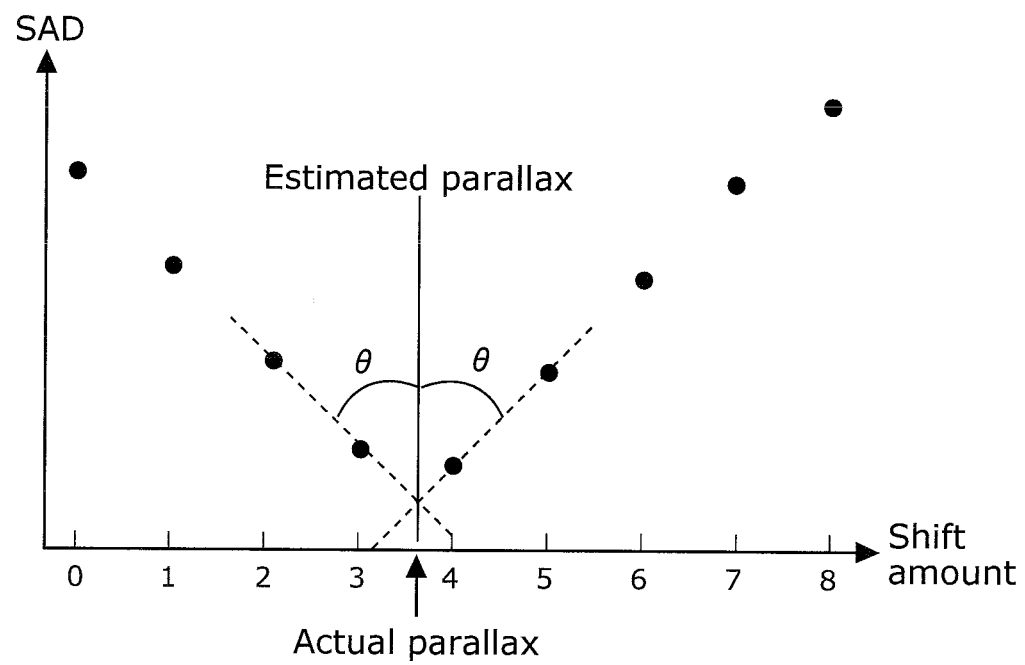
FIG. 5 is an illustration of a conventional sub-pixel parallax calculation.
Figure 9A:
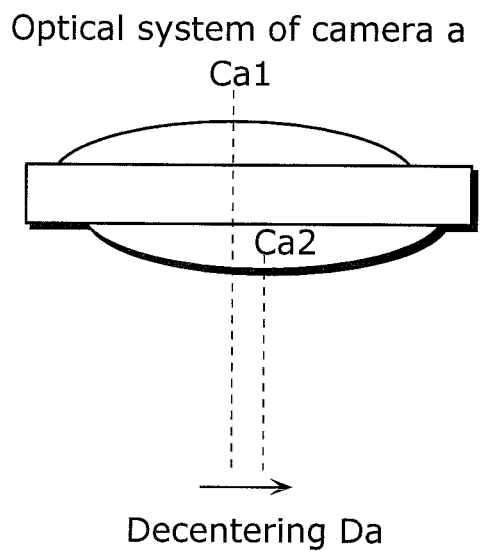
FIG. 9A is an illustration of decentering of lenses.
Figure 9B:
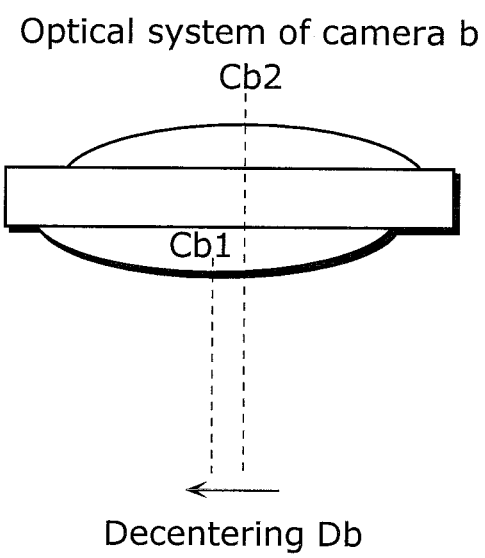
FIG. 9B is an illustration of decentering of lenses.
Figure 10A:
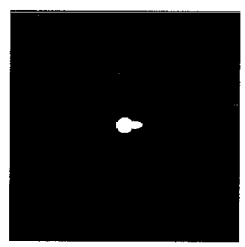
FIG. 10A is a diagram showing the point spread function of each optical system.
Figure 10B:
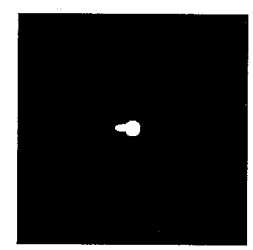
FIG. 10B is a diagram showing the point spread function of each optical system.

For example, in the case where decentering Da at one surface side of the lens 102a of the camera a and decentering Db at one surface side of the lens 102b of the camera b in FIG. 1 occur in the opposite sides in the horizontal direction of the imaging device as shown in FIGS. 9A and 9B, the point spread function (PSF) of the camera a is, for example, as shown in FIG. 10A, and the point spread function (PSF) of the camera b is, for example, as shown in FIG. 10B.

Here, the point spread function is also referred to as a point distribution function. The point spread function means an image obtained when an extremely small point light source is captured by a camera and shows the aberration distribution (the degree of blur) in the optical system of the camera.

Figure 11A:
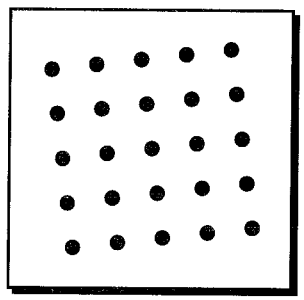
FIG. 11A is a diagram showing a subject.
Figure 11B:
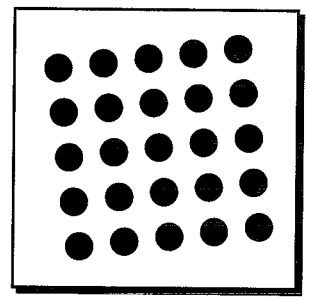
FIG. 11B is a diagram showing a subject.
Figure 12A:
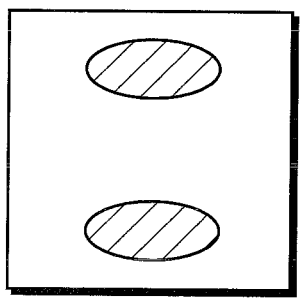
FIG. 12A is a diagram showing regions in which the degree of distance measurement error is large.
Figure 12B:
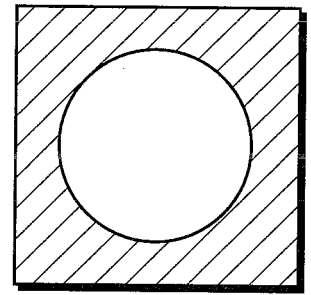
FIG. 12B is a diagram showing a region in which the degree of distance measurement error is large.

Here is an exemplary experiment of measuring a distance of a subject in FIG. 11A or FIG. 11B using optical systems having a difference in the aberration distributions as shown in FIG. 10A and FIG. 10B. The result of this experiment shows that the distance measurement accuracy in the region with diagonal lines in FIG. 12 or FIG. 12B decreases more significantly than in the other region. The distributions of regions in which distance measurement accuracy decreases in FIG. 12 and FIG. 12B change due to a difference in either the optical designs of the cameras or the point spread functions for the respective areas in the images. The distance measurement result shows an example obtained in the case where each of the optical systems is formed with a single lens and optically designed to have a focal length of 2 mm, a half angle of view of 30 degrees, an F-number of 2.8, a pixel pitch of 2 μm, and both of decentering Da and decentering Db are approximately 5 μm. The region with diagonal lines in FIG. 12A and FIG. 12B roughly show the regions in each of which the degree of parallax detection error (distance measurement error) approximately corresponding to one or more pixels occur. Here, the distance between the optical systems is 2.8 mm.

Figure 13A:
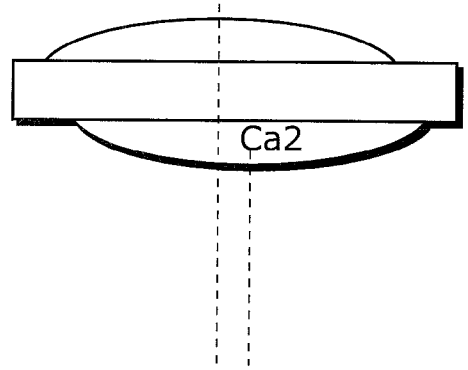
FIG. 13A is an illustration of decentering of lenses.
Figure 13B:
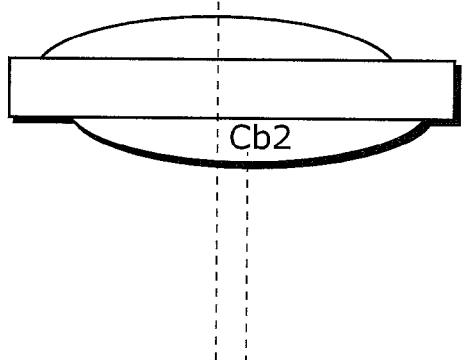
FIG. 13B is an illustration of decentering of lenses.
Figure 14A:
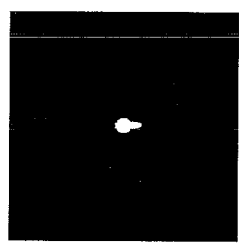
FIG. 14A is a diagram showing an after-modification point spread function.
Figure 14B:
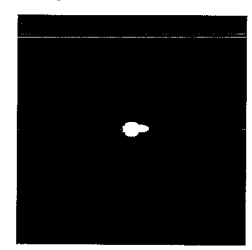
FIG. 14B is a diagram showing an after-modification point spread function.

Here is another case where (i) decentering Da of the lens 102a of the camera a and decentering Db of the lens 102b of the camera b occur in the same side in the horizontal direction of the imaging device and the amounts of the decentering are the same as shown in FIGS. 13A and 13B, and (ii) the point spread functions of the camera a and the camera b are the same as shown in FIG. 14A and FIG. 14B. In this case, when the subject in FIG. 11A and the subject FIG. 11B are subjected to distance measurement, a high distance measurement accuracy is obtained for each of the subjects throughout the images. Accordingly, in the case where the aberration distributions of cameras are significantly different, the distance measurement accuracies vary depending on the regions in the images or subjects. In short, a large inter-camera difference in the aberration distributions increases the degree of parallax detection error.

In view of this, a parallax detecting apparatus is described with reference to the drawings. The parallax detecting apparatus is capable of suppressing the degree of parallax detection error even when use of cameras each having a lens whose resolution is low for the pitch of the pixels of the imaging devices makes a large difference in the aberration distributions of the cameras.

The parallax detecting apparatus according to Embodiment 1 of the present invention modifies, on the frequency domain, an image obtained from a second optical system such that the point spread function of the second optical system is the same as the point spread function of a first optical system. In this way, a distance measuring apparatus can increase the distance measurement accuracy even when the aberration distributions of the cameras are significantly different.

In addition, the parallax detecting apparatus according to Embodiment 2 of the present invention modifies, on the frequency domain, input images such that the point spread functions of all the optical systems are made to sufficiently approximate the point spread function of an optical system that functions as a model optical system. In this way, a distance measuring apparatus can increase the distance measurement accuracy even when the aberration distributions of the cameras are significantly different.

Embodiment 1

First, a description is given of a distance measuring system according to Embodiment 1 of the present invention.

A parallax detecting apparatus 3 according to this embodiment modifies an image captured by a camera 2b such that the point spread function of a second optical system of the camera 2b is the same as the point spread function of a first optical system of a camera 2a. In this way, a parallax detecting apparatus 3 can increase the accuracies in a parallax calculation and a distance measurement. In this embodiment, the first optical system corresponds to a predetermined optical system, and corresponds to one of the optical systems which is an optical system that functions as a reference optical system.

FIG. 15A is a diagram of a distance measuring system according to Embodiment 1 of the present invention. As shown in FIG. 15A, the distance measuring system includes a distance measuring apparatus 1 and a PSF modification data generating apparatus 20.

The distance measuring apparatus 1 measures the distance to an object, or either the three dimensional position or shape of the object, using the parallax that occurs between the first optical system and the second optical system. The distance measuring apparatus 1 includes cameras 2a and 2b, the parallax detecting apparatus 3, and a distance calculating unit 11.

The camera 2a includes the first optical system and imaging devices, and captures an object that is a distance measurement target. The camera 2b includes the second optical system and imaging devices, and captures the same object as the object captured by the camera 2a.

In this embodiment, each of the first and second optical systems is formed with a single lens, and optically designed to have a focal length of 2 mm, a half angle of view of 30 degrees, and an F-number of 2.8. In addition, the decentering corresponding to approximately 5 μm exists in each of the optical axes. It is to be noted that each of the cameras 2a and 2b may not be formed as described above, and each of the optical systems may be formed with plural lenses.

The distance calculating unit 11 calculates the distance to the object, or either the three dimensional position or shape of the object, using the parallax output from the parallax detecting apparatus 3. More specifically, the distance calculating unit 11 calculates a distance D according to Expression (1) using, for example, the parallax output from the parallax detecting apparatus 3 and a base line length B and a focal length f which are known by a calibration performed in advance.

The parallax detecting apparatus 3 calculates the parallax that occurs between these two cameras 2a and 2b. More specifically, the parallax detecting apparatus 3 receives two images output from the respective cameras 2a and 2b, and calculates the parallax based on the received two images. As shown in FIG. 15A, the parallax detecting apparatus 3 includes a pre-processing unit 4, a parallax calculating unit 9, and a post-processing unit 10.

The pre-processing unit 4 modifies the image so that a parallax can be easily detected. More specifically, the pre-processing unit 4 modifies, using the PSF approximating unit 5, the image captured by the camera 2b such that the point spread functions of the first and second optical systems are sufficiently approximate to each other. Furthermore, the pre-processing unit 4 performs a calibration including rectification and low-pass filtering on the image captured by the camera 2a and the image captured by the camera 2b and modified by the PSF approximating unit 5.

The pre-processing unit 4 does not need to always perform the PSF approximation, calibration, and low-pass filtering in this sequence, and may change the processing order as necessary.

The PSF approximating unit 5 corresponds to a point spread function approximating unit, and performs processing for sufficiently approximating the aberration distributions of the two images output from the two cameras. More specifically, the PSF approximating unit 5 modifies the image obtained from the second optical system such that the point spread functions of the first and second optical systems are sufficiently approximate to each other. The PSF approximating unit 5 includes a frequency domain transformation unit 6, a PSF transformation unit 7, and a spatial domain transformation unit 8.

The frequency domain transformation unit 6 transforms the image obtained from the second optical system from the spatial domain to the frequency domain. More specifically, the frequency domain transformation unit 6 transforms, using two dimensional Fourier transformation, an input image fob (i, j) captured by the camera 2b into before-modification complex data Fob (u, v) that is frequency domain data.

The following descriptions are given assuming that the size of an image to be subjected to two dimensional Fourier transformation is M pixels in the vertical direction, and N pixels in the horizontal direction (i=0, 1, 2, ... M−1, j=0, 1, 2, ... N−1, u=0, 1, 2, ... M−1, v=0, 1, 2, ... N−1).

The PSF transformation unit 7 corresponds to a point spread function transformation unit. The PSF transformation unit 7 modifies an image such that the point spread functions of the first and second optical systems are sufficiently approximate to each other by reflecting modification data to the image transformed into frequency domain by the frequency domain transformation unit 6. More specifically, the PSF transformation unit 7 reflects modification data Fc (u, v) to the before-modification complex data Fob (u, v) to generate after-modification complex data Fob' (u, v), and outputs the generated one.

Here, the modification data Fc (u, v) is either (i) data obtained by dividing a first optical transfer function of the first optical system that is the reference optical system by a second optical transfer function that is an optical transfer function of the optical system (the second optical system) in which the image to be modified using this modification data is obtained, or (ii) data equivalent to the data listed as (i).

The PSF transformation unit 7 and modification data will be described in detail later on.

The spatial domain transformation unit 8 inversely transforms the image modified by the PSF transformation unit 7 from the frequency domain to the spatial domain. More specifically, the spatial domain transformation unit 8 performs two dimensional inverse Fourier transformation on the after-modification complex data Fob' (u, v) to generate after PSF modification image fcb (i, j), and outputs the generated one.

The parallax calculating unit 9 calculates a parallax between the images using the aforementioned correlation value SAD or the like, based on the pre-processed images of the camera 2a and camera 2b output from the pre-processing unit 4.

The post-processing unit 10 performs post-processing such as a parallax amount modification and an output format adjustment on the parallax calculated by the parallax calculating unit 9, and outputs the parallax calculation result. More specifically, the post-processing unit 10 removes noise in parallax calculated by the parallax calculating unit 9, using a median filter or the like. In addition, for example, the post-processing unit 10 converts the pixel-based parallax calculated by the parallax calculating unit 9 into a parallax per millimeter.

The PSF modification data generating apparatus 20 generates modification data that is either (i) data obtained by dividing the first optical transfer function by the second optical transfer function that is the optical transfer function of the optical system in which the image to be modified by the PSF approximating unit 5 is obtained, or (ii) data equivalent to the data listed as (i). For example, the PSF modification data generating apparatus 20 calculates the modification data Fc (u, v) to be used in the PSF transformation unit 7, prior to the time when a user uses the distance measuring apparatus 1, for example, before shipment from a factory. As shown in FIG. 15A, the PSF modification data generating apparatus 20 includes a unit 21 for processing before modification data calculation, a frequency domain transformation unit 22, a modification data calculating unit 23, and a unit 24 for processing after modification data calculation.

The unit 21 for processing before modification data calculation obtains point spread functions of the first and second optical systems from the cameras 2a and 2b. Next, the unit 21 for processing before modification data calculation performs pre-processing such as a brightness adjustment in the obtained point spread functions. It is to be noted that the point spread functions of the first and second optical systems can be obtained when, for example, each of the cameras 2a and 2b captures an extremely small point light source.

The frequency domain transformation unit 22 transforms the point spread functions of the first and second optical systems pre-processed by the unit 21 for processing before modification data calculation from the spatial domain to the frequency domain. In short, the frequency domain transformation unit 22 transforms the point spread function of the first optical system into the first optical transfer function, and the point spread function of the second optical system to the second optical transfer function.

The modification data calculating unit 23 calculates modification data that is either (i) data obtained by dividing the first optical transfer function of the first optical system that is the reference optical system by the second optical transfer function of the second optical system, or (ii) data equivalent to the data listed as (i).

The unit 24 for processing after modification data calculation performs processing, for example, noise removal, output format adjustment and the like on the modification data calculated by the modification data calculating unit 23.

Next, a description is given of operations performed by the distance measuring system configured as described above.

Figure 15B:
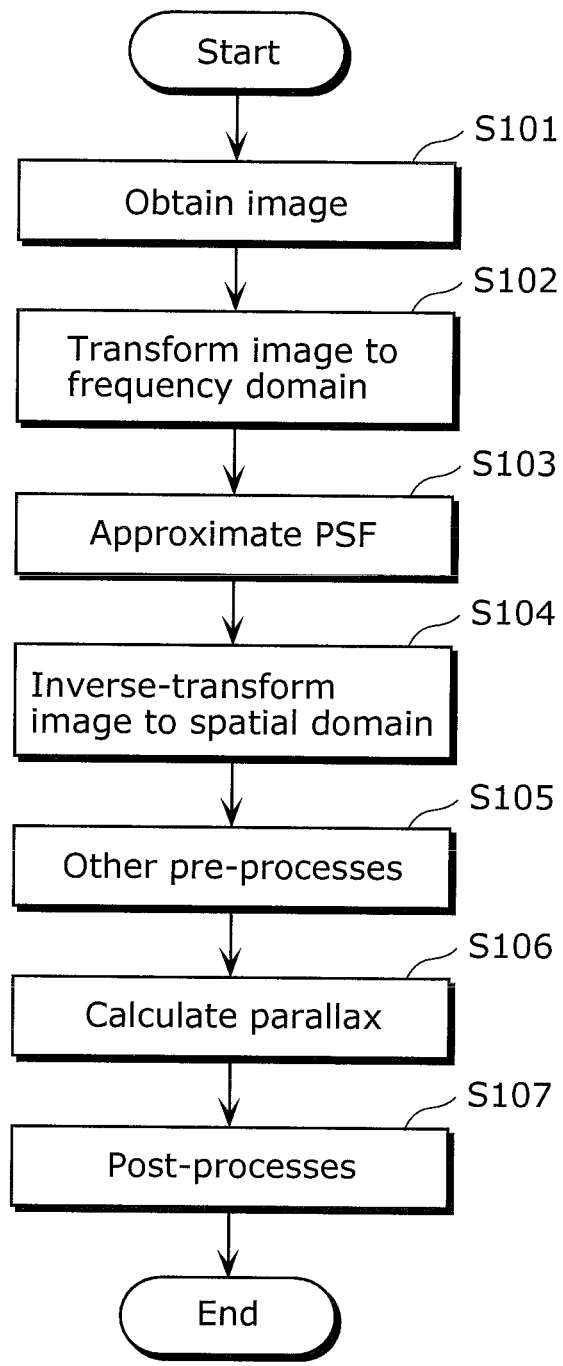
FIG. 15B is a flowchart indicating parallax calculation processes performed by a parallax detecting apparatus according to Embodiment 1 of the present invention.

FIG. 15B is a flowchart indicating parallax calculation processes performed by a parallax detecting apparatus according to Embodiment 1 of the present invention.

First, the pre-processing unit 4 obtains an image captured by the cameras 2a and 2b (Step S101). Subsequently, the PSF approximating unit 5 selects one of images that has been captured by the camera 2b that is other than the camera 2a having the reference optical system, and the frequency domain transformation unit 6 transforms the selected image from the spatial domain to the frequency domain (Step S102).

Next, the PSF transformation unit 7 modifies the image such that the point spread functions of the first and second optical systems are sufficiently approximate to each other, by reflecting the modification data to the image transformed into the frequency domain (Step S103). More specifically, the PSF transformation unit 7 modifies the image of the camera 2b transformed into the frequency domain, by multiplying the transformed image by the modification data Subsequently, the spatial domain transformation unit 8 inversely transforms the modified image from the frequency domain to the spatial domain (Step S104). Furthermore, the pre-processing unit 4 performs pre-processing such as calibration including rectification and low-pass filtering on the inversely transformed image and the image that has been captured by the camera 2a and thus has not been selected in Step S102 (Step S105).

Subsequently, the parallax calculating unit 9 calculates a parallax using the image pre-processed in Step S106 (Step S106). More specifically, the parallax calculating unit 9 calculates correlation values indicating the degrees of similarity between the pairs of mutually-corresponding small areas in the pre-processed images of cameras 2a and 2b. Furthermore, the parallax calculating unit 9 calculates, as a parallax, a shift amount for each pair of mutually-corresponding small areas in the images, using the calculated correlation value.

Lastly, the post-processing unit 10 performs post-processing such as a noise removal and an output format adjustment for the calculated parallax (Step S107).

In this way, the parallax detecting apparatus 3 calculates a parallax that occurs between the optical systems, using the images for which the point spread functions of the optical systems of the two cameras 2a and 2b are made sufficiently approximate to each other.

Next, a specific example of a distance measuring system is described below in detail.

First, a description is given of the principle and method of calculating modification data Fc (u, v) by the PSF modification data generating apparatus 20.

Figure 16:
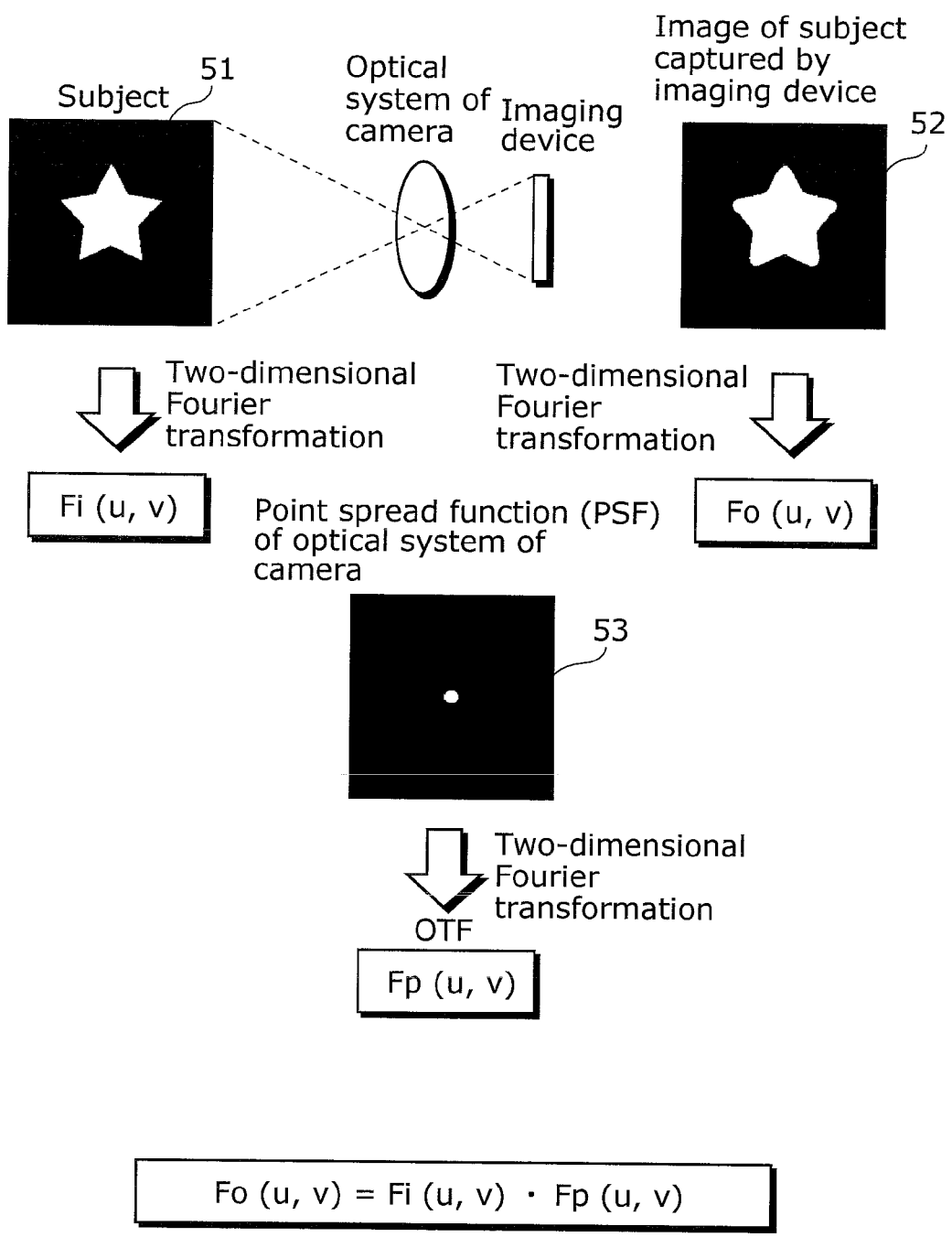
FIG. 16 is a diagram illustrating the relationship between a subject and the aberration distribution of an image of the subject according to Embodiment 1 of the present invention.

FIG. 16 is a diagram illustrating the relationship between a subject and the aberration distribution of an image of the subject. As shown in FIG. 16, Fi (u, v) denotes data obtained by performing two dimensional Fourier transformation on the original subject image 51 (here, the image is equivalent to an image of the subject captured using an ideal lens having no aberration). Likewise, Fo (u, v) denotes data obtained by performing two dimensional Fourier transformation on an subject image 52 formed on the imaging devices through the optical systems of the cameras. In addition, Fp (u, v) denotes an optical transfer function (OTF) obtained by performing two dimensional Fourier transformation on the point spread function 53 of the optical system of the camera. At this time, the following Expression (4) is satisfied when the complexes Fi (u, v), Fo (u, v), and Fp (u, v) are obtained by performing two dimensional Fourier transformation on the image at an identical sampling interval.

[Math. 4]

$$Fo(u,v)=Fi(u,v)\cdot Fp(u,v) \ (u=0,1,2,\ldots M-1, v=0,1,2,\ldots N-1)$$ (Expression 4)

Here, two dimensional Fourier transformation is represented as Expression (5) using image data f (i, j) and frequency domain complex data F (u, v).

[Math. 5]

$$F(u, v) = \sum_{i=0}^{M-1}\sum_{j=0}^{N-1} f(i, j) e^{-2\pi i\left(\frac{ui}{M}+\frac{vj}{N}\right)}$$ (Expression 5)

The two dimensional Fourier transformation may naturally be calculated according to a Fast Fourier transformation (FFT) approach.

Figure 17A:
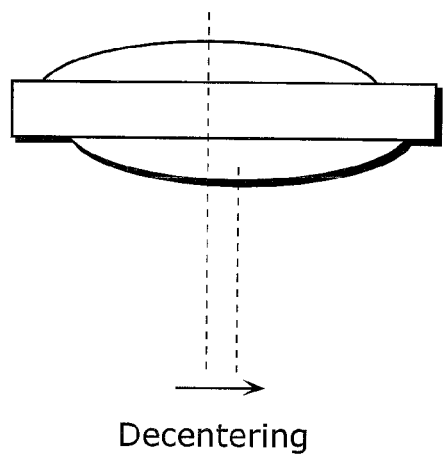
FIG. 17A is an illustration of decentering of lenses in a first optical system according to Embodiment 1 of the present invention.
Figure 17B:
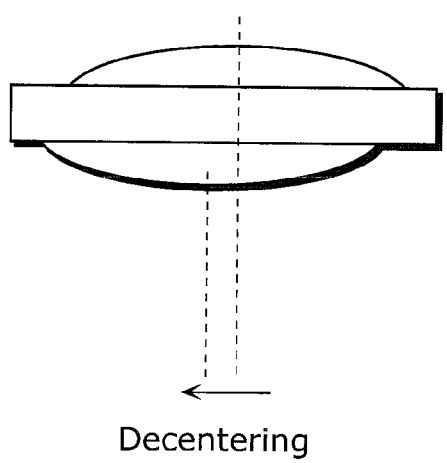
FIG. 17B is an illustration of decentering of lenses in a second optical system according to Embodiment 1 of the present invention.

In the distance measuring unit 1 according to this embodiment shown in FIG. 15A, the first optical system of the camera 2a and the second optical system of the camera 2b are different in the decentering directions as shown in FIG. 17A and FIG. 17B. Accordingly, the point spread functions of the first and second optical systems are mutually different.

Figure 18A:
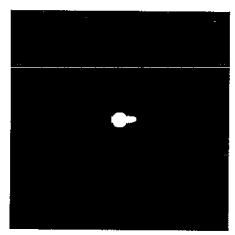
FIG. 18A is a diagram showing the point spread function of the first optical system according to Embodiment 1 of the present invention.
Figure 18B:
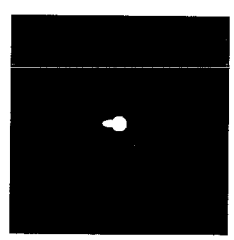
FIG. 18B is a diagram showing the point spread function of the second optical system according to Embodiment 1 of the present invention.

FIG. 18A is a diagram showing the point spread function (PSF) of the first optical system of the camera 2a. Likewise, FIG. 18B is a diagram showing the point spread function (PSF) of the second optical system of the camera 2b. The frequency domain transformation unit 22 performs two dimensional Fourier transformation on the point spread functions in FIG. 18A and FIG. 18B. As a result, the frequency domain transformation unit 22 outputs Fpa (u, v) that is the OTF (the first optical transfer function) of the first optical system of the camera 2a and Fpb (u, v) that is the OTF (the second optical transfer function) of the second optical system of the camera 2b. Fpa (u, v) and Fpb (u, v) are mutually different because the aberration distributions (the degrees of blur) of images captured by the cameras 2a and 2b are mutually different.

Subsequently, the modification data calculating unit 23 calculates modification data for making the aberration distribution of the image captured by the camera 2b sufficiently approximate to the aberration distribution of the image captured by the camera 2a.

Here, considering the relational Expression (4), the after-modification complex data Fob' can be represented as shown by Expression (6) using the before-modification complex data Fob (u, v) obtained after the subject image of the camera 2b is subjected to the two dimensional Fourier transformation.

[Math. 6]

$$Fob'(u, v) = Fob(u, v) \cdot \frac{Fpa(u, v)}{Fpb(u, v)}$$ (Expression 6)

$$(u = 0, 1, 2, \ldots M-1, v = 0, 1, 2, \ldots N-1)$$

The parallax detecting apparatus 3 is capable of making the aberration distribution of the image captured by the camera 2b sufficiently approximate to the aberration distribution of the image captured by the camera 2a, by performing two dimensional Fourier transformation on the after-modification complex data Fob' (u, v) calculated according to Expression (6). The two dimensional inverse Fourier transformation can be represented by Expression (7) assuming that the complex data is F (u, v), and the image data is f (i, j).

[Math. 7]

$$f(i, j) = \frac{1}{MN}\sum_{u=0}^{M-1}\sum_{v=0}^{N-1} F(u, v) e^{2\pi i\left(\frac{ui}{M}+\frac{vj}{N}\right)}$$ (Expression 7)

As with the two dimensional Fourier transformation shown in Expression (5), this two dimensional Fourier transformation may naturally be calculated using a Fast Fourier transformation (FFT) approach.

Figure 19A:
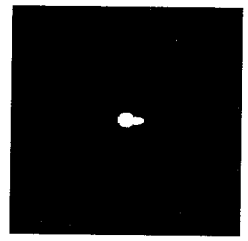
FIG. 19A is a diagram showing the point spread function of the first optical system according to Embodiment 1 of the present invention.
Figure 19B:
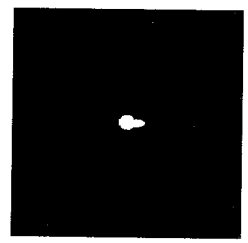
FIG. 19B is a diagram showing the point spread function of the second optical system according to Embodiment 1 of the present invention.

FIG. 19B is a diagram showing the point spread function after the point spread function of the second optical system of the camera 2b in FIG. 18B is modified according to Expression (6). The image of FIG. 19B is an image having the same point spread function as the point spread function of the first optical system of the camera 2a shown in FIG. 19A.

Based on Expression (6), the modification data calculating unit 23 calculates the modification data Fc (u, v) for making the aberration distribution of the image of the camera 2b sufficiently approximate to the aberration distribution of the image of the camera 2a, as shown by Expression (8).

[Math. 8]

$$Fc(u, v) = \frac{Fpa(u, v)}{Fpb(u, v)}$$ (Expression 8)

$$(u = 0, 1, 2, \ldots M-1, v = 0, 1, 2, \ldots N-1)$$

In other words, the modification data calculating unit 23 calculates, as modification data, data obtained by dividing the first optical transfer function of the first optical system that is the reference optical system by the second optical transfer function of the second optical system that is the optical system in which the image to be modified by the PSF approximating unit is obtained.

It is to be noted that, depending on optical designs, the magnitudes of complexes (frequency components) particularly in high-spatial frequency regions may be zero or values approximate to zero. In this case, Fc (u, v) values may be undesirable due to an adverse effect of noise stemming from the imaging devices. At this time, for example, the modification data calculating unit 23 may calculate the modification data Fc (u, v) according to a statistical approach using either the Wiener filter for reducing divergence of modification data Fc (u, v) values using, for example, zero division, the Bayes' theorem, or the like. In short, the modification data calculating unit 23 may calculate, as modification data, the data corresponding to the data obtained by dividing the first optical transfer function by the second optical transfer function. This reduces the possibility that inaccurate values are obtained as such modification data Fc (u, v).

Next, the unit for processing after modification data calculation performs a modification of the modification data Fc (u, v), an adjustment of output format thereof, and the like. The PSF transformation unit 7 modifies an image, using the modification data Fc (u, v) output from the unit 24 for processing after modification data calculation.

According to the aforementioned principle and approach, the PSF modification data generating apparatus 20 calculates modification data Fc (u, v) from the point spread functions (PSFs) of the cameras 2a and 2b.

Figure 20:
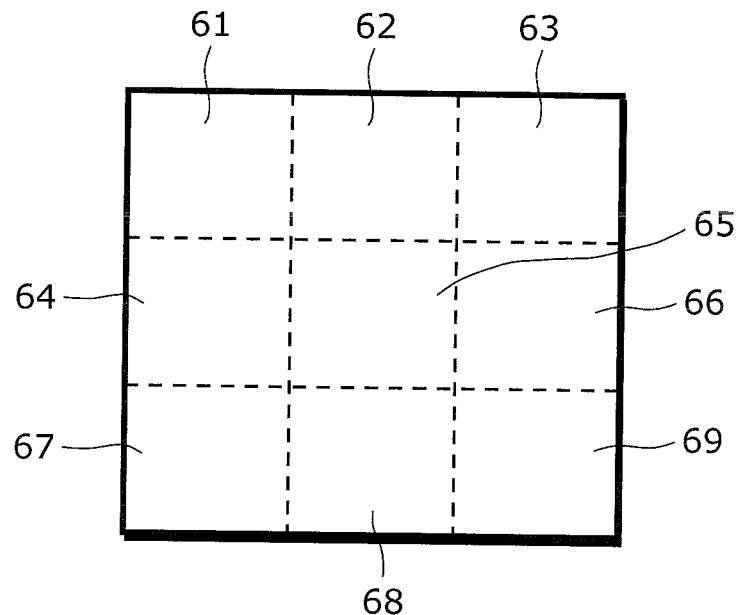
FIG. 20 is a diagram showing an example of region division in a modification data calculation process and a point spread function approximation process according to a variation of Embodiment 1 of the present invention.

In the case where the point spread functions are significantly different depending on image angles, the PSF modification data generating apparatus 20 may calculate such modification data Fc (u, v) for each pair of mutually-corresponding areas. More specifically, the PSF modification data generating apparatus 20 may calculate the modification data Fc (u, v) for each pair of mutually-corresponding areas by, for example, dividing an image into plural areas 61 to 69 as shown in FIG. 20, and calculating the point spread function of each of the divided areas.

Next, the PSF transformation unit 7 is described in detail.

The PSF transformation unit 7 receives an input of before-modification complex data Fob (u, v) obtained when the frequency domain transformation unit 6 performs two dimensional Fourier transformation on the image fob (i, j) of the camera 2b. The PSF transformation unit 7 calculates the after-modification complex data Fob' (u, v) according to Expression (9), using the modification data Fc (u, v) calculated in advance by the PSF modification data generating apparatus 20.

[Math. 9]

$$Fob'(u,v)=Fc(u,v) \cdot Fob(u,v) \ (u=0,1,2,\ldots M-1, v=0,1,2,\ldots N-1)$$ (Expression 9)

The spatial domain transformation unit 8 performs two dimensional Fourier transformation on the after-modification complex data Fob' (u, v) modified by the PSF transformation unit 7. In this way, the PSF approximating unit 5 can generate an image of the camera 2b that has been modified to have an aberration distribution that is sufficiently approximate to the aberration distribution of the image of the camera 2a. In short, parallax calculation is to be performed using an image equivalent to the image obtained from the optical system having the sufficiently approximate point spread function.

Here, in an exemplary case where modification data Fc (u, v) is calculated for each pair of mutually-corresponding areas in the images as shown in FIG. 20, the PSF transformation unit 7 calculates modified complex data Fob' of the camera 2b for each pair of mutually-corresponding areas in the images in the same manner.

The modification data Fc (u, v) may be stored, as a table, in a storage unit such as a flash ROM. In addition, the modification data Fc (u, v) may be stored, in the storage unit, as an approximate function representing the modification data Fc (u, v). In short, the modification data Fc (u, v) may be stored in a manner according to the apparatus.

As described above, Embodiment 1 of the present invention makes it possible to reduce the difference in the aberration distributions of images captured by different cameras. This reduces the difference in distortion in the images of the same subject captured by the different cameras, and therefore it is possible to suppress the degree of parallax detection error. More specifically, even when cameras each having a lens whose resolution is low for the pitch of the pixels of the imaging devices are used and thus the resulting aberration distributions are significantly different between the cameras, it is possible to increase accuracy in stereo distance measurement.

In addition, in Embodiment 1, since there is no need to perform calculation for modifying the aberration distribution of a reference camera (camera 2a here), it is possible to perform high-speed calculation.

Figure 21:
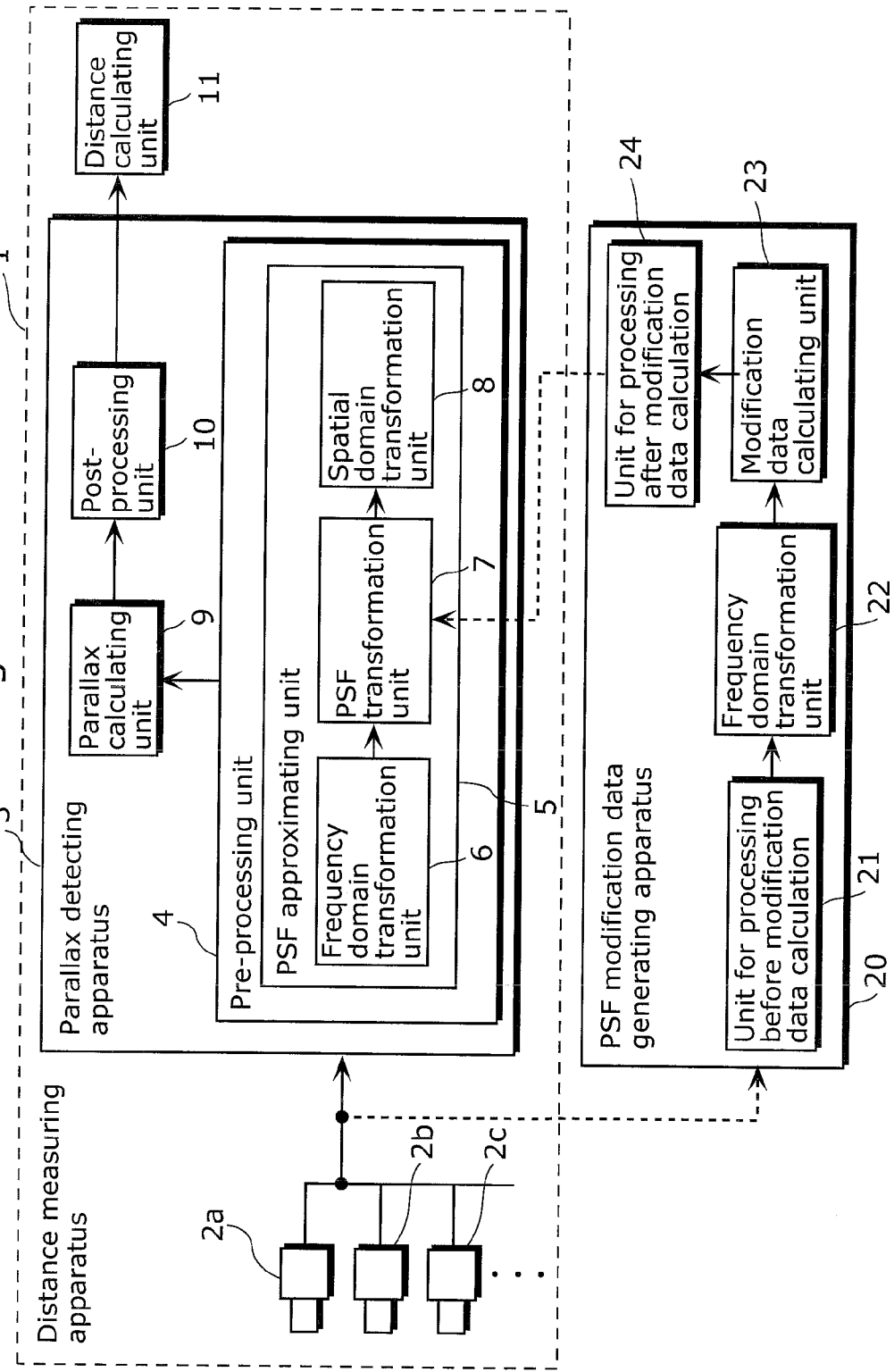
FIG. 21 is a structural diagram of a distance measuring system according to the variation of Embodiment 1 of the present invention.

Naturally, Embodiment 1 of the present invention can be applied to distance measuring apparatuses including three or more cameras (a so-called multi-eye stereo having three or more eyes) as shown in FIG. 21. In this case, the parallax detecting apparatus modifies the images captured by cameras (for example, cameras 2b and 2c) other than a reference camera (for example, a camera 2a) among the three cameras, using a method similar to the aforementioned method of making the point spread function of the second optical system of the camera 2b sufficiently approximate to the point spread function of the first optical system of the camera 2a. In this way, the parallax detecting apparatus can make the point spread functions of the optical systems of the respective cameras sufficiently approximate to the point spread function of the reference camera. In short, the parallax detecting apparatus can reduce the difference between aberration distributions of images of all the cameras, and thereby being able to suppress the degree of parallax detection error.

Embodiment 2

Next, Embodiment 2 of the present invention is described.

A distance measuring system according to this embodiment is configured similarly to the distance measuring system in Embodiment 1 shown in FIG. 15A, and thus no additional illustration thereof is provided. This embodiment is different from Embodiment 1 in the internal processing performed by a PSF modification data generating apparatus 20 and a PSF approximating unit 5. Accordingly, descriptions are given of the processing performed by the PSF modification data generating apparatus 20 and the PSF approximating unit 5.

The parallax detecting apparatus according to this embodiment modifies images of all cameras such that the point spread functions of the optical systems of all the cameras are made to sufficiently approximate the point spread function fps (i, j) of the optical system of a camera that functions as a model (hereinafter, simply referred to as a "model camera"). In this way, the parallax detecting apparatus can increase the accuracy in a parallax calculation and a distance measurement by making the point spread functions of the different cameras sufficiently approximate to each other. In this embodiment, the optical system of the model camera corresponds to a predetermined optical system.

In this embodiment, the PSF modification data generating apparatus 20 calculates modification data Fca (u, v) and Fcb (u, v) for making three point spread functions (PSFs) of these cameras 2a, 2b, and 2c sufficiently approximate to the point spread function (PSF) of the optical system of the model camera. As in Embodiment 1, the point spread function of the first optical system of the camera 2a is a point spread function shown in FIG. 18A, and the point spread function of the second optical system of the camera 2b is a point spread function shown in FIG. 18B.

The unit 21 for processing before modification data calculation performs pre-processing such as a brightness adjustment on the point spread functions of the first and second optical systems.

The frequency domain transformation unit 22 performs two dimensional Fourier transformation on each of the point spread functions pre-processed by the unit 21 for processing before modification data calculation. As a result, the frequency domain transformation unit 22 calculates the OTF of the camera 2a as Fpa (u, v), and the OTF of the camera 2b as Fpb (u, v). The optical systems of the cameras 2a and 2b have different point spread functions because they have different decentering directions as shown in FIG. 17A and FIG. 17A. Since the aberration distributions (the degrees of blur) of images are different, Fpa (u, v) and Fpb (u, v) are mutually different.

Figure 22:
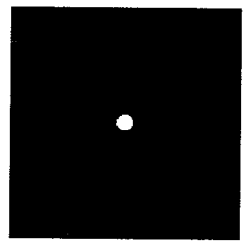
FIG. 22 is a diagram showing the point spread function of a model camera according to Embodiment 2 of the present invention.

FIG. 22 is a diagram showing the point spread function fps (i, j) of the model camera. This point spread function fps (i, j) is transformed into optical transfer function Fps (u, v) by two dimensional Fourier transformation.

The modification data calculating unit 23 calculates modification data for making the aberration distribution of the image captured by the camera 2b sufficiently approximate to the aberration distribution of the model camera. Here, considering the relational Expression (4), the after-modification complex data Foa' (u, v) and Fob' (u, v) can be represented as shown by Expressions (10) and (11) using the before-modification complex data Foa (u, v) and Fob (u, v) obtained after the images of the subject captured by the cameras 2a and 2b are subjected to two dimensional Fourier transformation.

[Math. 10]

$$Foa'(u, v) = Foa(u, v) \cdot \frac{Fps(u, v)}{Fpa(u, v)} \quad \text{(Expression 10)}$$

$$(u = 0, 1, 2, \ldots M - 1, v = 0, 1, 2, \ldots N - 1)$$

[Math. 11]

$$Fob'(u, v) = Fob(u, v) \cdot \frac{Fps(u, v)}{Fpb(u, v)} \quad \text{(Expression 11)}$$

$$(u = 0, 1, 2, \ldots M - 1, v = 0, 1, 2, \ldots N - 1)$$

The parallax detecting apparatus 3 is capable of making the aberration distributions of the cameras 2a and 2b sufficiently approximate to the aberration distribution of the model camera, by performing two dimensional inverse Fourier transformation on the after-modification complex data Foa' (u, v) and Fob' (u, v) calculated according to Expressions (10) and (11).

Figure 23A:
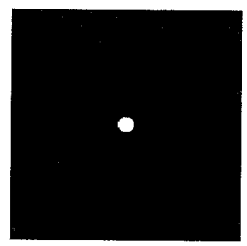
FIG. 23A is a diagram showing a modified point spread function of the first optical system according to Embodiment 2 of the present invention.
Figure 23B:
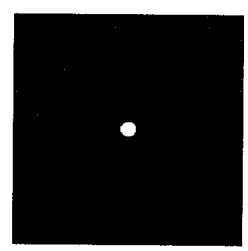
FIG. 23B is a diagram showing the point spread function of the second optical system according to Embodiment 2 of the present invention.

Each of FIG. 23A and FIG. 23B is a diagram showing an image obtained by modifying the point spread function of the optical system of a corresponding one of the cameras 2a and 2b in FIG. 18A and FIG. 18B according to Expressions (10) and (11). Each of the images in FIG. 23A and FIG. 23B is a point spread function sufficiently approximate to the point spread function of the model camera shown in FIG. 22.

Based on Expressions (10) and (11), the modification data calculating unit 23 calculates modification data Fca (u, v) and Fcb (u, v) for making the aberration distributions of the images of the camera 2a and 2b sufficiently approximate to the aberration distribution of the model camera as shown by Expression (13).

[Math. 12]

$$Fca(u, v) = \frac{Fps(u, v)}{Fpa(u, v)} \quad \text{(Expression 12)}$$

$$(u = 0, 1, 2, \ldots M - 1, v = 0, 1, 2, \ldots N - 1)$$

[Math. 13]

$$Fcb(u, v) = \frac{Fps(u, v)}{Fpb(u, v)} \quad \text{[Math. 13]}$$

$$(u = 0, 1, 2, \ldots M - 1, v = 0, 1, 2, \ldots N - 1)$$

More specifically, the modification data calculating unit 23 calculates, as modification data of the first and second optical systems, data obtained by dividing the optical transfer function of the model optical system by the optical transfer function of either the first optical system or the second optical system that is the optical system in which the image to be modified by the PSF approximating unit 5 is obtained.

It is to be noted that, depending on optical designs, the magnitudes of complexes particularly in high-spatial frequency regions may be zero or values approximate to zero. In this case, Fca (u, v) values and Fcb (u, v) values may be inaccurate due to an adverse effect of noise stemming from the imaging devices. In such a case, the modification data calculating unit 23 may calculate the modification data Fca (u, v) and Fcb (u, v), according to a statistical approach using either the Wiener filter for reducing divergence of modification data Fca (u, v) and Fcb (u, v) values using, for example, zero division, the Bayes' theorem, or the like. In short, the modification data calculating unit 23 may calculate, as the modification data of either the first optical system or the second optical system, the data corresponding to the data obtained by dividing the optical transfer function of the model optical system by the optical transfer function of the first optical system or the second optical system. This reduces the possibility that inaccurate values are obtained as such modification data Fca (u, v) and Fcb (u, v).

The unit 24 for processing after modification data calculation performs a modification of the modification data Fca (u, v) and Fcb (u, v), an adjustment of output format thereof, and the like. The PSF transformation unit 7 modifies an image, using the modification data Fca (u, v) and Fcb (u, v) output from the unit 24 for processing after modification data calculation.

According to the aforementioned approach, the PSF modification data generating apparatus 20 calculates modification data Fca (u, v) and Fcb (u, v) from the point spread functions (PSFs) of the model camera, the camera 2a, and the camera 2b.

It is to be noted that, in the case where the point spread functions are significantly different depending on image angles, the PSF modification data generating apparatus 20 may calculate such modification data Fca (u, v) and Fcb (u, v) for each pair of mutually-corresponding areas in the images. More specifically, the PSF modification data generating apparatus 20 may calculate the modification data Fca (u, v) and Fcb (u, v) for each pair of mutually-corresponding areas by, for example, dividing an image into plural areas 61 to 69 as shown in FIG. 20, and calculating the point spread function of each of the divided areas.

Next, the PSF approximating unit 5 is described.

The PSF transformation unit 7 receives an input of before-modification complex data Foa (u, v) and Fob (u, v) obtained when the frequency domain transformation unit 6 performs two dimensional Fourier transformation on the image foa (i, j) of the camera 2a and the image fob (i, j) of the camera 2b. The PSF transformation unit 7 calculates the after-modification complex data Foa' (u, v) and Fob' (u, v) according to Expressions (14) and (15), using the modification data Fca (u, v) Fcb (u, v) calculated in advance by the PSF modification data generating apparatus 20.

[Math. 14]

$$Foa'(u,v) = Fca(u,v) \cdot Foa(u,v) \ (u=0,1,2,\ldots M-1, v=0,1, 2,\ldots N-1) \quad \text{(Expression 14)}$$

[Math. 15]

$$Fob'(u,v) = Fcb(u,v) \cdot Fob(u,v) \ (u=0,1,2,\ldots M-1, v=0,1, 2,\ldots N-1) \quad \text{(Expression 15)}$$

The spatial domain transformation unit 8 performs inverse Fourier transformation on the after-modification complex data Foa' (u, v) and Fob' (u, v) modified by the PSF transformation unit 7. In this way, the PSF approximating unit 5 can generate images of the cameras 2a and 2b each of which has been modified to have an aberration distribution that is sufficiently approximate to the aberration distribution of the model camera. In short, parallax calculation is to be performed using an image equivalent to the image obtained from the optical system having the sufficiently approximate point spread function.

Here, in an exemplary case where modification data Fca (u, v) and Fcb (u, v) is calculated for each pair of mutually-corresponding areas in the images as shown in FIG. 20, the PSF transformation unit 7 calculates modified complex data Foa' and Fob' of the cameras 2a and 2b for each pair of mutually-corresponding areas in the images in the same manner.

The modification data Fca (u, v) and Fcb (u, v) may be stored, as a table, in a storage unit such as a flash ROM. In addition, each of the modification data Fca (u, v) and Fcb (u, v) may be stored, in the storage unit, as an approximate function representing the corresponding one of the modification data Fca (u, v) and Fcb (u, v). In short, the modification data Fca (u, v) and Fcb (u, v) may be stored in a manner according to the apparatus.

As described above, Embodiment 2 of the present invention makes it possible to reduce the difference in the aberration distributions of images captured by the different cameras. This reduces the difference in distortion in the images of the same subject captured by the different cameras, and therefore it is possible to suppress the degree of parallax detection error. In short, it is possible to increase accuracy in distance measurement by stereo cameras.

In this embodiment, it is preferable that the resolution characteristics of the model camera are more excellent than the resolution characteristics of the actual cameras (the cameras 2a and 2b here). In this case, the distance measuring apparatus 1 and the parallax detecting apparatus 3 can generate images modified to have a resolution higher than the resolution of the captured images, and thereby being able to output the high-resolution images in addition to the distance measurement data.

In other words, it is preferable that the optical transfer function of the optical system of the model camera shows frequency characteristics more flat than the frequency characteristics shown by the first and second optical transfer functions. More specifically, it is preferable that the optical transfer function of the optical system of the model camera has a ratio that is (i) of a magnitude of a value in a second spatial frequency with respect to a value in the first spatial frequency and (ii) greater than ratios of magnitudes of values in the optical transfer functions of the first and second optical systems with respect to the same. Here, the second spatial frequency being higher than the first spatial frequency.

In particular, it is more preferable that the resolution characteristics of the model camera show zero aberration (the magnitudes of OTFs are approximately the same in all the spatial frequency ranges). In this way, either the distance measuring apparatus 1 or the parallax detecting apparatus 3 can generate and output images each having an extremely high resolution.

In other words, it is preferable that the optical transfer function of the optical system of the model camera may be a function indicating flat frequency characteristics. In short, it is preferable that the magnitudes of the values of the optical transfer function of the optical system of the model camera are sufficiently approximate in the respective spatial frequency ranges.

Naturally, Embodiment 2 of the present invention can be applied to distance measuring apparatuses including three or more cameras (a so-called multi-eye stereo having three or more eyes) as shown in FIG. 21. In this case, the parallax detecting apparatus modifies the images captured by the camera 2c and the other cameras, using a method similar to the aforementioned method of making the point spread functions of the optical systems of the cameras 2a and 2b sufficiently approximate to the point spread function of the model camera. In this way, the parallax detecting apparatus can make the point spread functions of the optical systems of the cameras 2a, 2b, and 2c sufficiently approximate to the point spread function of the optical system of the model camera. In short, the parallax detecting apparatus can reduce the difference between aberration distributions of images of all the cameras, and thereby being able to suppress the degree of parallax detection error.

The distance measuring system according to the present invention has been described above based on the above-described embodiments, but the present invention is not limited to these embodiments. Those skilled in the art will readily appreciate that many modifications and variations of the exemplary embodiments are possible by combining arbitrary structural elements in the embodiments without materially departing from the novel teachings and advantages of the present invention. Accordingly, all such modifications and variations are intended to be included within the scope of the present invention.

For example, in the above embodiments, the distance measuring apparatus and the parallax detecting apparatus do not include any PSF modification data generating device, but they may include such a PSF modification data generating device as the modification data generating unit. With this, the distance measuring apparatus and the parallax detecting apparatus can generate modification data according to the after-change point spread functions even when a change is made in the point spread functions of the optical systems.

In addition, the parallax detecting apparatus in the embodiments is provided to a distance measuring apparatus, but it is not always necessary that the parallax detecting apparatus is provided to a distance measuring apparatus. For example, the parallax detecting apparatus may output a calculated parallax to another apparatus. More specifically, the parallax detecting apparatus may output a parallax to, for example, an apparatus which generates a three dimensional video.

In addition, a part or all of the structural elements of the distance measuring apparatus and the parallax detecting apparatus in the above embodiments may be configured with an LSI. More specifically, for example, the functional blocks of the pre-processing unit, the parallax calculating unit, and the post-processing unit shown in FIG. 15A and FIG. 21 may be configured with an LSI. These functional blocks may be made as separate individual chips, or as a single chip to include a part or all thereof. The means for circuit integration is not limited to an LSI, and implementation with a dedicated circuit or a general-purpose processor is also available. In addition, it is also possible to use a Field Programmable Gate Array (FPGA) that is programmable after the LSI is manufactured, and a reconfigurable processor in which connections and settings of circuit cells within the LSI are reconfigurable.

Furthermore, the present invention may be implemented as a parallax detecting method having the steps corresponding to the operations performed by the unique structural elements of the parallax detecting apparatus. Furthermore, the present invention can be implemented as a program causing a computer having a processor and a memory to execute these steps of the parallax detecting method. Such a program can be distributed through recording media such as CD-ROMs or via communication media such as the Internet.

INDUSTRIAL APPLICABILITY

The present invention relates to parallax detecting apparatuses each of which is capable of calculating a parallax that occurs between plural optical systems for imaging the same object, and relates to distance measuring apparatuses each of which is capable of calculating the distance from the apparatus to an object, or either the three dimensional position or shape of the object. The present invention is useful for applications for cars, monitoring, medical, robots, games, CG image generation, three dimensional image input, and the like.

[Reference Signs List]

| | |
|---|---|
| 1 | Distance measuring apparatus |
| 2a, 2b, 2c | Camera |
| 3 | Parallax detecting apparatus |
| 4 | Pre-processing unit |
| 5 | PSF approximating unit |
| 6 | Frequency domain transformation unit |
| 7 | PSF transformation unit |
| 8 | Spatial domain transformation unit |
| 9 | Parallax calculating unit |
| 10 | Post-processing unit |
| 11 | Distance calculating unit |
| 20 | PSF modification data generating apparatus |
| 21 | Unit for processing before modification data calculation |
| 22 | Frequency domain transformation unit |
| 23 | Modification data calculating unit |
| 24 | Unit for processing after modification data calculation |
| 100 | Object |
| 101a, 101b | Light beam |
| 102a, 102b | Lens |
| 103a, 103b | Optical axis |
| 104a, 104b | Imaging area |
| 105a, 105b | Optical center |
| 106a, 106b | Intersection between optical axis and imaging area |
| 107a, 107b | Image forming position |

The invention claimed is:

1. A parallax detecting apparatus which calculates a parallax that occurs between optical systems, the parallax detecting apparatus comprising:
a point spread function approximating unit configured to modify an image obtained from a source optical system, the point spread function approximating unit comprising:
a frequency domain transforming unit configured to transform the image from a spatial domain into a frequency domain;
a point spread function transforming unit configured to modify the transformed image by applying modification data to the transformed image, such that a point spread function of the source optical system is made to sufficiently approximate the point spread function of a predetermined optical system; and
a spatial domain transforming unit configured to inversely transform the modified image from the frequency domain to the spatial domain,
the parallax detecting apparatus further comprising a parallax calculating unit configured to calculate a parallax using at least the inversely transformed image,
wherein the modification data comprises data obtained by dividing a first optical transfer function by a second optical transfer function, the second optical transfer function being that of the source optical system.

2. The parallax detecting apparatus according to claim 1, wherein the point spread function transforming unit is configured to modify the image by multiplying the transformed image by the modification data.

3. The parallax detecting apparatus according to claim 1, wherein the first optical transfer function has a magnitude of a ratio of (i) a value in a second spatial frequency and a value in the first spatial frequency and (ii) is greater than a magnitude of a corresponding second optical transfer function of the optical system in which the image to be modified by the point spread function approximating unit is obtained, the second spatial frequency being higher than the first spatial frequency.

4. The parallax detecting apparatus according to claim 1, wherein magnitudes of values of the first optical transfer function are approximately the same in all the spatial frequency ranges.

5. The parallax detecting apparatus according to claim 1, further comprising a modification data generating unit configured to generate the modification data,
wherein the point spread function transforming unit is configured to apply the modification data generated by the modification data generating unit to the image transformed into the frequency domain by the frequency domain transforming unit.

6. A distance measuring apparatus comprising:
the parallax detecting apparatus according to claim 1; and
a distance calculating unit configured to calculate a distance to an object, using the parallax detected by the parallax detecting apparatus.

7. A parallax detecting method of calculating a parallax that occurs between optical systems, the parallax detecting method comprising:
transforming an image, obtained from a source optical system, from a spatial domain into a frequency domain;
modifying the transformed image by applying modification data to the transformed image, such that a point spread function of the source optical system is made to sufficiently approximate a point spread function of a predetermined optical system;
inversely transforming the modified image from the frequency domain to the spatial domain; and
calculating a parallax using at least the inversely transformed image,
wherein the modification data comprises data obtained by dividing a first optical transfer function by a second optical transfer function, the second optical transfer function being that of the source optical system.

8. A non-transitory computer-readable medium having a program stored thereon, the program causing a computer to execute the parallax detecting method according to claim 7.

9. The parallax detecting apparatus according to claim 1, wherein the parallax calculating unit configured to calculate the parallax using at least the inversely transformed image and an image obtained from the predetermined optical system, and
wherein the point spread function of the inversely transformed image sufficiently approximates the point spread function of the image from the predetermined optical system.

10. The parallax detecting apparatus according to claim 1, wherein the point spread function approximating unit is further configured to modify an image obtained from an another source optical system, wherein the frequency domain transforming unit is further configured to transform the image from the other source optical system from a spatial domain into a frequency domain, wherein the point spread function transforming unit is further configured to modify the transformed image by applying additional modification data to the transformed image, such that a point spread function of the other source optical system is made to sufficiently approximate the point spread function of a predetermined optical system, wherein the additional modification data comprises either (iii) data obtained by dividing the first optical transfer function by a third optical transfer function, the third optical transfer function being that of the other optical system or (iv) data equivalent to the obtained data of (iii), wherein the spatial domain transforming unit is further configured to inversely transform the modified image from the frequency domain to the spatial domain, and wherein the parallax calculating unit is configured to calculate the parallax using at least the inversely transformed image and the inversely transformed image.

11. The parallax detecting apparatus according to claim 10, wherein the parallax calculating unit is configured to calculate the parallax using at least the inversely transformed image, the inversely transformed additional image, and an image obtained from the predetermined optical system.

\* \* \* \* \*